UNITED STATES PATENT OFFICE

HERMANN WAGNER, OF BAD SODEN-ON-THE-TAUNUS, AND ERICH FISCHER, OF HOCHST-ON-MAIN, GERMANY, ASSIGNORS TO GENERAL ANILINE WORKS, INC., OF NEW YORK, N. Y., A CORPORATION OF DELAWARE

YELLOW MONOAZO DYESTUFF

No Drawing. Application filed May 1, 1928, Serial No. 274,357, and in Germany May 10, 1927.

Our present invention relates to yellow monoazo dyestuffs, more particularly to dyestuffs of the following general formula:

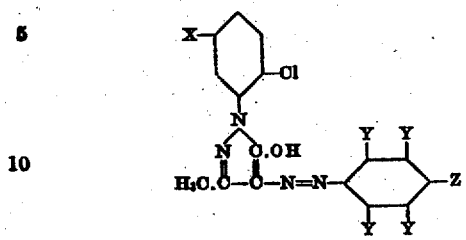

wherein
X stands for a sulfo group,
Y for any substituent and
Z for hydrogen, halogen or a sulfo group,
Z or one Y standing for a sulfo group.

We have found that by coupling a diazo compound from an anilinesulfonic acid with 1-(2'-chloro-5'-sulfophenyl)-3-methyl-5-pyrazolone yellow monoazo dyestuffs are obtained which are readily soluble in water and dye wool very even tints of an excellent fastness to water. Moreover the dyeings are distinguished by the green hue and the clearness of their tints and particularly by their excellent fastness to light.

The dyestuffs of our present invention are a valuable addition to the class of the acid pyrazolone azo dyestuffs, especially also as regards the easy manner and the low price at which they can be obtained.

The following examples illustrate our invention, but they are not intended to limit it; the parts are by weight:

(1) 288.5 parts of 1-(2'-chloro-5'-sulfophenyl)-3-methyl-5-pyrazolone of the formula:

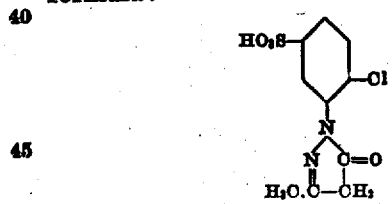

are dissolved in about 1000 parts of water and 212 parts of sodium carbonate. Into this solution is gradually run a diazo solution prepared in known manner from 173 parts of sulfanilic acid. When the coupling is complete the dyestuff is separated by the addition of a small quantity of sodium chloride. It is filtered by suction and dried and then forms a yellow powder which is readily soluble even in water containing lime and dyes wool a greenish-yellow tint. The dyeing is distinguished by its excellent fastness to light, very good evenness and fastness to water. The dyestuff has the following formula:

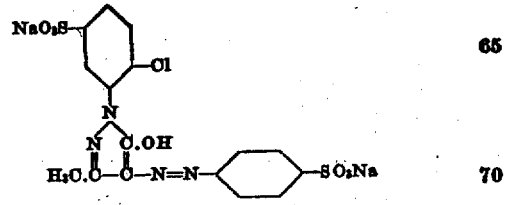

Instead of sodium carbonate there may also be used for instance another alkali carbonate, or an earth alkali carbonate or sodium acetate. The dyestuff can be obtained in the form of its sodium salt or potassium salt or another metal salt, according to the kind of acid binding agent used.

(2) 288.5 parts of 1-(2'-chloro-5'-sulfophenyl)-3-methyl-5-pyrazolone and 173 parts of ortho-sulfobenzenediazonium chloride are caused to interact in a manner analogous to that described in Example 1.

The yellow dyestuff thus obtained dyes wool yellow tints showing the same fastness properties but a greener hue compared with the dying obtainable according to the preceding example. The dyestuff has a good levelling power. It has the formula:

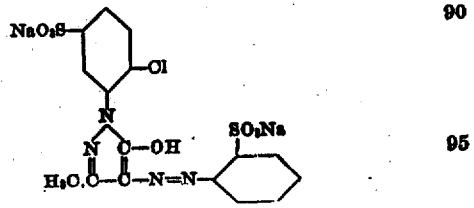

In the same manner there can for instance be obtained also the following dyestuffs:
2-methyl-1-amidobenzene-4-sulfonic acid →

1-(2'-chloro-5'-sulfophenyl)-3-methyl-5-pyrazolone.

Metanilic acid→1-(2'-chloro-5'-sulfophenyl)-3-methyl-5-pyrazolone.

2-chloro-1-aminobenzene-4-sulfonic acid→1-(2'-chloro-5'-sulfophenyl)-3-methyl-5-pyrazolone.

2.5-dichloro-1-aminobenzene-4-sulfonic acid→1-(2'-chloro-5'-sulfophenyl)-3-methyl-5-pyrazolone.

2.5-dichloro-1-aminobenzene-3-sulfonic acid→1-(2'-chloro-5'-sulfophenyl)-3-methyl-5-pyrazolone.

2-chloro-6-methyl-1-aminobenzene-4-sulfonic acid→1-(2'-chloro-5'-sulfophenyl)-3-methyl-5-pyrazolone.

2-bromo-6-methyl-1-aminobenzene-4-sulfonic acid→1-(2'-chloro-5'-sulfophenyl)-3-methyl-5-pyrazolone.

2.4-dichloro-1-aminobenzene-6-sulfonic acid→1-(2'-chloro-5'-sulfophenyl)-3-methyl-5-pyrazolone.

The above named dyestuffs are yellow powders, very readily soluble in water and dyeing wool greenish-yellow tints of good fastness properties.

We claim:

1. As new products, monoazo dyestuffs of the following general formula:

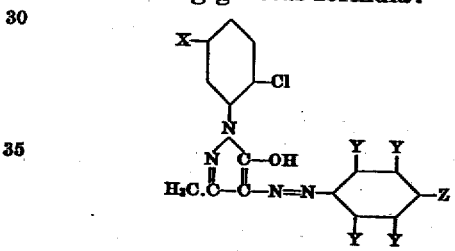

wherein
X stands for a sulfo group,
Y for any substituent and
Z for hydrogen, halogen or a sulfo-group, Z or one Y standing for a sulfo group, being yellow powders, very readily soluble in water and dyeing wool greenish-yellow tints of good fastness properties.

2. As new products, monoazo dyestuffs of the following formula:

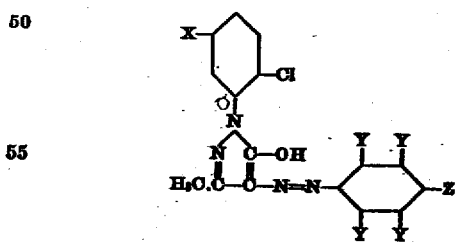

wherein
X stands for a sulfo group,
Y for hydrogen, alkyl, halogen or a sulfo-group and
Z for hydrogen or a sulfo group, Z or one Y for a sulfo group, being yellow powders, very readily soluble in water and dyeing wool greenish-yellow tints of good fastness properties.

3. As new products, monoazo dyestuffs of the following formula:

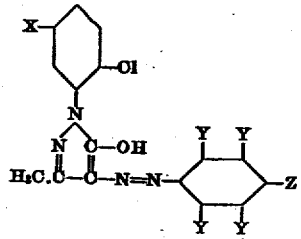

wherein
X and Z stand for a sulfo group and Y stands for hydrogen, alkyl or halogen, being yellow powders, very readily soluble in water and dyeing wool greenish-yellow tints of good fastness properties.

4. As new products, monoazo dyestuffs of the following formula:

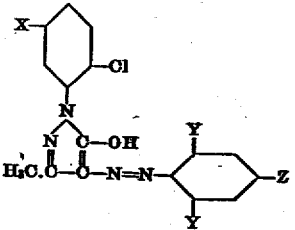

wherein
X and Z stand for a sulfo group and Y stands for hydrogen, alkyl or halogen, being yellow powders, very readily soluble in water and dyeing wool greenish-yellow tints of good fastness properties.

5. As new products, monoazo dyestuffs of the following formula:

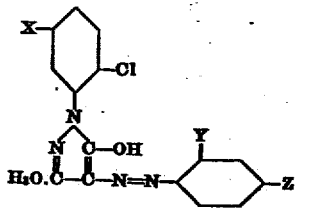

wherein
X and Z stand for a sulfo group and Y stands for hydrogen, alkyl or halogen, being yellow powders, very readily soluble in water and dyeing wool greenish-yellow tints of good fastness properties.

6. As new products, monoazo dyestuffs of the following formula:

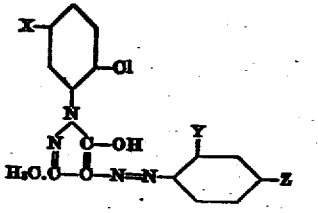

wherein
X and Z stand for a sulfo group and

Y for hydrogen or chlorine, being yellow powders, very readily soluble in water and dyeing wool greenish-yellow tints of good fastness properties.

7. As a new product, the monoazo dyestuff of the following formula:

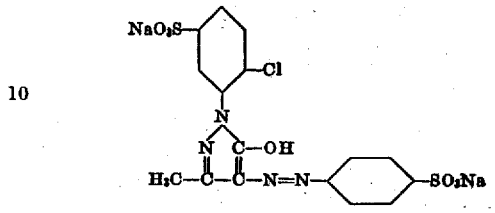

being a yellow powder which is readily soluble even in water containing lime and dyes wool a greenish-yellow tint of excellent fastness to light, very good evenness and fastness to water.

In testimony whereof, we affix our signatures.

HERMANN WAGNER.
ERICH FISCHER.

CERTIFICATE OF CORRECTION.

Patent No. 1,730,179.                                        Granted October 1, 1929, to

HERMANN WAGNER ET AL.

It is hereby certified that error appears in the printed specification of the above numbered patent requiring correction as follows: Page 2, line 111, in the formula for "H sub 3 O.C" read "H sub 3 C.C"; and the said Letters Patent should be read with this correction therein that the same may conform to the record of the case in the Patent Office.

Signed and sealed this 29th day of October, A. D. 1929.

(Seal)

M. J. Moore,
Acting Commissioner of Patents.

Y for hydrogen or chlorine, being yellow powders, very readily soluble in water and dyeing wool greenish-yellow tints of good fastness properties.

7. As a new product, the monoazo dyestuff of the following formula:

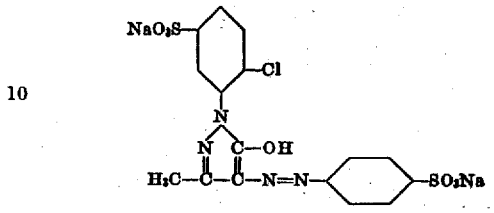

being a yellow powder which is readily soluble even in water containing lime and dyes wool a greenish-yellow tint of excellent fastness to light, very good evenness and fastness to water.

In testimony whereof, we affix our signatures.

HERMANN WAGNER.
ERICH FISCHER.

CERTIFICATE OF CORRECTION.

Patent No. 1,730,179.    Granted October 1, 1929, to

HERMANN WAGNER ET AL.

It is hereby certified that error appears in the printed specification of the above numbered patent requiring correction as follows: Page 2, line 111, in the formula for "H sub 3 O.C" read "H sub 3 C.C"; and the said Letters Patent should be read with this correction therein that the same may conform to the record of the case in the Patent Office.

Signed and sealed this 29th day of October, A. D. 1929.

(Seal)

M. J. Moore,
Acting Commissioner of Patents.